US011805044B2

(12) United States Patent
Vaina (10) Patent No.: US 11,805,044 B2
(45) Date of Patent: Oct. 31, 2023

(54) APPLICATION USAGE TIME ESTIMATION

(71) Applicant: Cujo LLC, Walnut, CA (US)

(72) Inventor: Kazimieras Vaina, Vilnius (LT)

(73) Assignee: Cujo LLC, Walnut, CA (US)

( * ) Notice: Subject to any disclaimer, the term of this patent is extended or adjusted under 35 U.S.C. 154(b) by 130 days.

(21) Appl. No.: 17/314,461

(22) Filed: May 7, 2021

(65) Prior Publication Data

US 2022/0360515 A1 Nov. 10, 2022

(51) Int. Cl.
*H04L 43/50* (2022.01)
*G06N 20/00* (2019.01)
*H04L 43/08* (2022.01)
*H04L 43/16* (2022.01)

(52) U.S. Cl.
CPC ............ *H04L 43/50* (2013.01); *G06N 20/00* (2019.01); *H04L 43/08* (2013.01); *H04L 43/16* (2013.01)

(58) Field of Classification Search
CPC ........ H04L 43/50; H04L 43/08; H04L 43/16; H04L 43/026; H04L 63/1408; H04L 63/168; H04L 67/10; H04L 67/535; G06N 20/00; G06N 3/045; G06N 3/063; G06N 3/08
See application file for complete search history.

(56) References Cited

U.S. PATENT DOCUMENTS

| 2015/0356581 A1 | 12/2015 | Litmanovich et al. |
| 2016/0261472 A1 | 9/2016 | Tubi et al. |
| 2020/0076910 A1 | 5/2020 | Perman |
| 2021/0103644 A1* | 4/2021 | Madishetti ............ H04W 12/61 |
| 2021/0182732 A1* | 6/2021 | Peng .................... H04M 3/2218 |
| 2021/0382710 A1* | 12/2021 | Joubert .................. G06N 20/00 |
| 2022/0214917 A1* | 7/2022 | Chien ................. G06F 9/45558 |
| 2022/0225114 A1* | 7/2022 | Feng ..................... H04W 16/10 |

OTHER PUBLICATIONS

Extended European Search Report for EP Patent Application No. 22171734.1, dated Oct. 10, 2022, 8 pages.

* cited by examiner

*Primary Examiner* — Charles C Jiang
*Assistant Examiner* — Shawn D Miller
(74) *Attorney, Agent, or Firm* — Dority & Manning, P.A.

(57) ABSTRACT

An application detection method includes running one or more applications in various application scenarios on one or more user devices for a predetermined time period, capturing network traffic data generated by the one or more applications, labelling the network traffic data according to an application scenario of the one or more applications and with respect to a user device of the one or more user devices, determining an active application usage time in relation to the application scenario during the predetermined time period based on the labelling, training a machine learning model to estimate the active application usage time based on the determining, and using the machine learning model to estimate the active application usage time on the one or more user devices.

20 Claims, 4 Drawing Sheets

APPLICATION USAGE TIME ESTIMATION

TECHNICAL FIELD

The present application relates generally to network security.

BACKGROUND

It can be desirable to have reliable application usage time estimation for enabling different security protection features, such as blocking specific applications and enforcing time limits to applications or application categories.

SUMMARY

According to an aspect of the invention there is provided a method as specified in claim 1.

According to other aspect of the invention, there is provided a computer network system as specified in claim 10.

According to other aspect of the invention, there is provided an apparatus in a computer network system as specified in claim 17.

According to other aspect of the invention, there is provided a non-transitory computer-readable medium comprising stored program code, the program code comprised of computer-executable instructions that, when executed by a processor, causes the processor to operate as specified in claim 20.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for the purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message", and does not imply a priority, a type, an importance, or other attribute, unless otherwise stated herein.

As used herein and in the claims, the articles "a" and "an" in reference to an element refers to "one or more" of the elements unless otherwise explicitly specified. The word "or" as used herein and in the claims is inclusive unless contextually impossible. As an example, the recitation of A or B means A, or B, or both A and B.

The figures and the following description relate to the example embodiments by way of illustration only. Alternative embodiments of the structures and methods disclosed herein will be readily recognized as viable alternatives that may be employed without departing from the principles of what is claimed.

Reliable active application usage time determination is needed for enabling different security protection features, such as blocking specific applications, enforcing time limits to applications or application categories.

The determination/estimation processes are complicated by frequent application updates changing the networking behavior of the applications and thus, forcing updates on the detection process.

There is a need for automated techniques for estimating active application usage time in computer networks.

Figure 1:
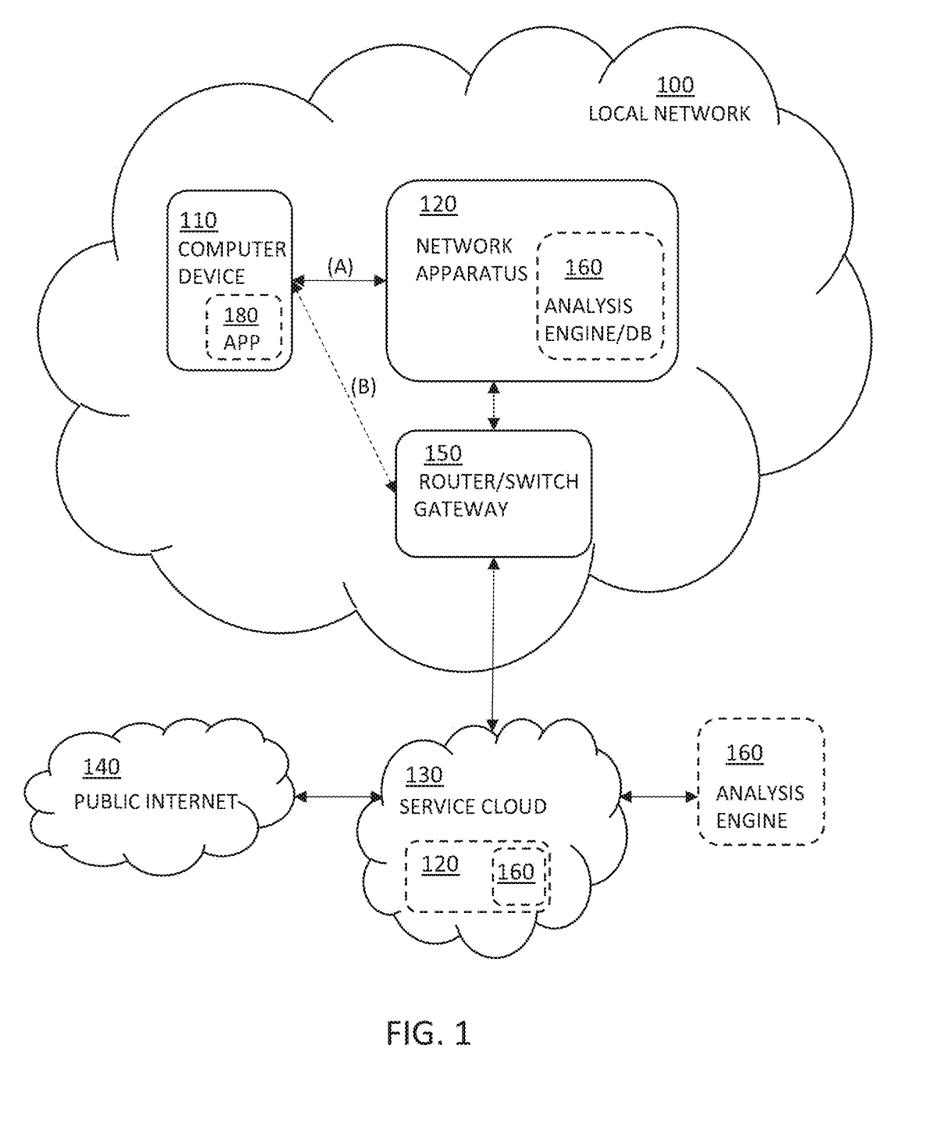
FIG. 1 illustrates an example system environment for a network apparatus in a computer network system.

FIG. 1 illustrates schematically an example of a system environment for a network apparatus 120. The system environment illustrated in FIG. 1 includes a computer network 100, such as a local network, that may include one or more computer devices 110, the network apparatus 120, a local router/switch 150, and an analysis engine and a database 160. The computer devices 110 may also comprise any number of client applications 180. The example system also includes a service cloud 130, such as a network operator's cloud and the Internet 140. The analysis engine/database 160 may reside in the computer network, in the service cloud 130 or elsewhere in the network. There may also be more than one analysis engines 160 thus enabling at least part of the analysis being processed in more than one analysis engines. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

In an embodiment, the device 110 may communicate (A) via the network apparatus 120 residing in the computer network 100. In another embodiment, the device 110 may communicate (B) directly via a network gateway or a modem 150, for example when the device is not in the computer network 100. In an embodiment, the network operators may deploy a service platform on their broadband gateways 150 provided to customers and in their own cloud environments 130. The user device(s) 110 may also be configured to use the services provided by the service cloud 130 by one or more applications/operating systems 180 installed on the device(s) 110.

The device 110 may be any computer device, such a smart device, a smart appliance, a smart phone, a laptop, or a tablet having a network interface and an ability to connect to the network apparatus 120 and/or the local network router 150 with it. The network apparatus 120 collects information, e.g., about the computer network 100, including data about the network traffic through the computer network 100 and data identifying devices in the computer network 100, such as any smart appliances and user devices 110. The network apparatus 120 is configured to receive traffic control instructions from the analysis engine 160 and to process network traffic based on the traffic control instructions. Processing the network traffic through the computer network 100, for example, can include enforcing network or communication policies on devices, restricting where network traffic can travel, blocking network traffic from entering the computer network 100, redirecting a copy of network traffic packet or features of those packets to the analysis engine 160 for analysis (e.g., for malicious behavior), or quarantining the network traffic to be reviewed by a user (e.g., via the user device 110) or network administrator. In some embodiments, the functionality of the network apparatus 120 is performed by a device that is a part of the computer network 100, while in other embodiments, the functionality of the network apparatus 120 is performed by a device outside of the computer network 100.

The network apparatus 120 may be configured to monitor traffic that travels through the computer network 100. In some embodiments, the network apparatus 120 can be a device that is a part of the computer network 100. The network apparatus 120 can be connected to the computer network 100 using a wired connection (e.g., via an Ethernet cable connected to a router) or using a wireless connection (e.g., via a Wi-Fi connection). In some embodiments, the network apparatus 120 can comprise multiple devices. In some embodiments, the network apparatus 120 can also perform the functions of the local network router 150 for the computer network 100.

In some embodiments, the network apparatus 120 may intercept traffic in the computer network 100 by signaling to the user device 110 that the network apparatus 120 is a router 150. In some embodiments, the network apparatus 120 replaces the default gateway or gateway address of the computer network 100 with its own Internet protocol address. In some embodiments, the computer network 100 can be structured such that all network traffic passes through the network apparatus 120, allowing the network apparatus 120 to physically intercept the network traffic. For example, the network apparatus 120 can serve as a bridge through which all network traffic must travel to reach the router 150 of the computer network 100.

The analysis engine 160 may receive and analyze network traffic data (e.g., forwarded by the network apparatus 120) associated with devices on the computer network. The analysis engine 160 may be implemented within a remote system (e.g., a cloud server) or within the computer network 100. The analysis engine 160 may perform operations that are computationally expensive for the network apparatus 120 to perform. In some embodiments, the analysis engine 160 replaces the network apparatus 120 by performing the functionalities of the network apparatus 120. In these embodiments, the computer network router 150 may be configured to forward network traffic to the analysis engine 160. In some embodiments, the analysis engine 160 communicates with other devices on the computer network. In some embodiments, the analysis engine 160 is integrated into the network apparatus 120.

The computer network 100 may be a local area network (LAN) that comprises the one or more devices 110, network apparatus 120, and local network router 150. The computer network 100 may be used for a number of purposes, including a home network or a network used by a business. The computer network 100 is connected to the Internet or other Inter-autonomous network infrastructure 140, allowing devices within the computer network 100, including the user device 110, to communicate with devices outside of the computer network 100. The computer network 100 may be a private network that may require devices to present credentials to join the network, or it may be a public network allowing any device to join. In some embodiments, other devices, like personal computers, smartphones, or tablets, may join computer network 100.

The internet 140 and the computer network 100 may comprise any combination of LANs and wide area networks (WANs), using both wired and wireless communication systems. In some embodiments, the internet 140 and the computer network 100 use standard communications technologies and protocols. Data exchanged over the internet 140 and the computer network 100 may be represented using any suitable format, such as hypertext markup language (HTML) or extensible markup language (XML) or any other presentation or application layer format suitable for transporting data over a network. In some embodiments, all or some of the communication links of the internet 140 and the computer network 100 may be encrypted using any suitable technique or techniques.

The computer device 110 may be a computing device capable of receiving user input as well as transmitting and/or receiving data via the Internet 140 or computer network 100. In some embodiments, the device 110 is a conventional computer system, such as a desktop or a laptop computer. Alternatively, the device 110 may be a device having computer functionality, such as a personal digital assistant (PDA), a mobile telephone, a smartphone, or another suitable device. The device 110 is a network device configured to communicate with the Internet 140 or computer network 100. In some embodiments, the device 110 executes an application (e.g., application 180) allowing a user of the user device 110 to interact with other network devices, such as the smart appliances, the network apparatus 120, the router 150, or the analysis engine 160. For example, the device 110 executes a browser application to enable interaction between the device 110 and the network apparatus 120 via the computer network 100.

The client application 180 is a computer program or software application configured to run on the user device 110. For example, the application 180 is a web browser, a mobile game, an email client, or a mapping program. The device 110 can have any number of applications 180 installed. The application 180 may communicate, via the user device 110, with devices inside and outside of the computer network 100.

The computer network 100 can also be a small office and/or a domestic network that comprises several Internet of Things (IoT) and smart devices as well as portable computers and tablet computers, for example. One or more of these devices are connected to the Internet 140, for example, via one or more Wi-Fi access points.

Network traffic data can be analysed to calculate estimates on how long a particular application has been active on a user device. The term "active" here means that the user interacts with the application or the application is playing music or video content or is being in some other active state, for example. The process of estimating the active application usage time may start with classifying the network traffic data by application or platform. This may be achieved by using platform recognition rules that are usually manually maintained. Next, it is calculated how many/which minutes are considered active during the predetermined period of time. The calculation is based on the amount of network traffic generated by a platform per minute. If traffic of a particular platform crosses an arbitrary threshold during a minute, then this minute may be considered as active. The threshold values have to be manually tuned for each platform. Finally, application usage time in multiples of 5-minute usage amounts is approximated. A rigid logic is needed to implement this approximation.

However, over time applications are updated. Updates sometimes cause changes in the application network usage patterns as well, which in turn requires updates in the platform recognition rules and active minute thresholds. The platform recognition rules and active minute threshold values have to be manually maintained. Active minute approximation to, for example 5 minutes of activity, is many times hardcoded. It is difficult to adjust active minute thresholds because sometimes active minutes are triggered by application background activities as well.

Embodiments of the present invention overcome the drawbacks of the previous solutions by applying new capabilities and methods targeted to enable reducing some of the manual work and the need for rigid logics. The application usage time test automation framework currently automates test running as well as evaluation. However, when a drop in accuracy is detected, these thresholds and/or platform detection rules still need to be adjusted manually. Embodiments of the present invention enable automating this part. Further, the application usage thresholds are targeted at a single device type and a minimal usage. There are also cases when the application background activity is confused with active usage. The approximation logic may be misleading for the spotty usages, such as 2 minutes or less of applications usage over a 5-minute period. Embodiments of the present invention enable increasing active application usage detection accuracy in such corner cases as well.

Figure 2:
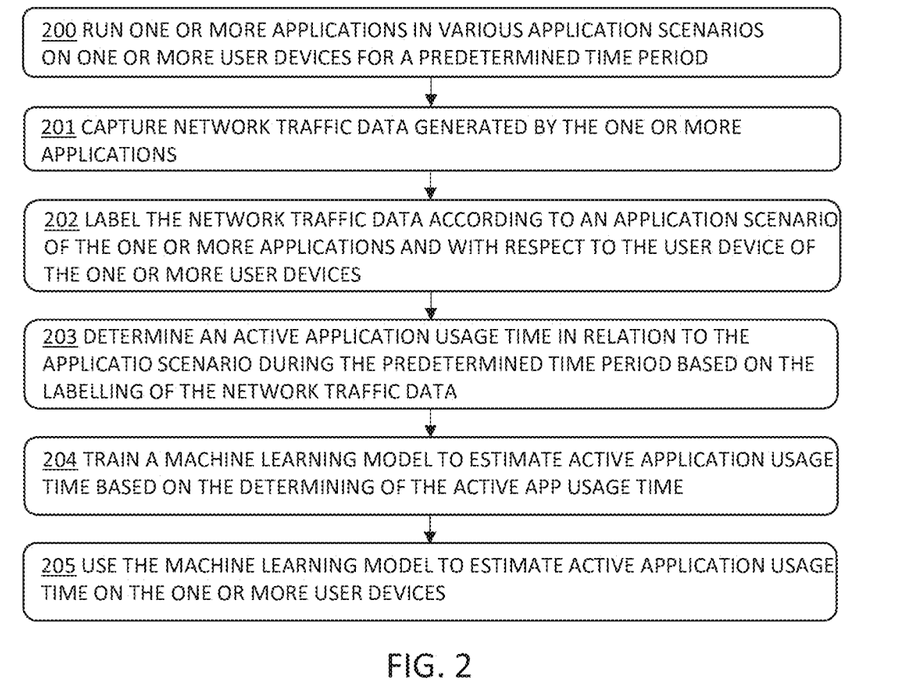
FIG. 2 is a flow diagram illustrating an example method, according to one embodiment.

FIG. 2 is a flow diagram illustrating an embodiment of a method.

In 200, one or more applications are run in various application scenarios on one or more user device for a predetermined time period.

In 202, network traffic data generated by the one or more applications is captured.

In 204, the network traffic data is labelled according to an application scenario of the one or more applications and with respect to the user device of the one or more user devices.

In 206, an active application usage time in relation to the application scenario during the predetermined time period is determined based on the labelling of the network traffic data.

In 208, a machine learning model is trained to estimate active application usage time based on the determining of the active application usage time.

In 210, the machine learning model is used to estimate active application usage time on the one or more user devices.

In an embodiment, the machine learning model is retrained continuously based on further network traffic data captured from the one or more user devices running applications in various application scenarios.

In an embodiment, an application scenario defines which applications are used in the one or more user devices and/or usage patterns of the applications. Application scenario information may comprise a set of actions or steps that are executed in the application in an ordered manner in predefined time intervals, for example. The application scenario may resemble a natural user interaction with an application. Example actions related to the application scenario may comprise one or more of: starting a media application, browsing media streams for 2 minutes, selecting a media stream, playing the media stream for 5 minutes, stopping playback, closing the application and any combination thereof. Various application scenarios are used to mimic user behaviour and for generating actions performed by the application about "typical" network traffic. This is then used by the machine learning model to recognize the application active time. For example, the network traffic that is generated by a (real or simulated) user interaction with an application differs from the network traffic that the application would generate just by running in the background. These are the differences that the machine learning model can be trained to learn.

In an embodiment, the one or more applications are run on one or more test devices interacting with the one or more applications in predefined application scenarios for simulating active application usage.

In an embodiment, the one or more applications are run on one or more user devices in one or more internet service provider networks.

In an embodiment, the method further comprises receiving an application screen time report from the one or more user devices and using the application screen time report for the labelling of the network traffic data according to the application scenario.

In an embodiment, the network traffic data generated by the one or more application is forwarded to a security service cloud for the labelling.

In an embodiment, the network traffic data is classified by a platform of the one or more user devices by using predetermined platform recognition rules. In an embodiment, a graph indicating the amount of network traffic data during the predetermined period of time is generated based on the labelling wherein different colors each indicate the related platform where graph label is inherited from the network traffic data, and the machine learning model is trained based on the generated graph.

In an embodiment, further action is taken to protect one or more local network and/or the one or more user devices based on the estimated active application usage time. The further action may comprise one or more of: reporting application usage time to the one or more user devices, reporting application usage statistics, controlling or blocking usage of the one or more applications, enforcing time limits to the one or more applications or application categories, preventing communication with the one or more applications, and applying other security measures to protect a local network and/or the one or more user devices.

Figure 3A:
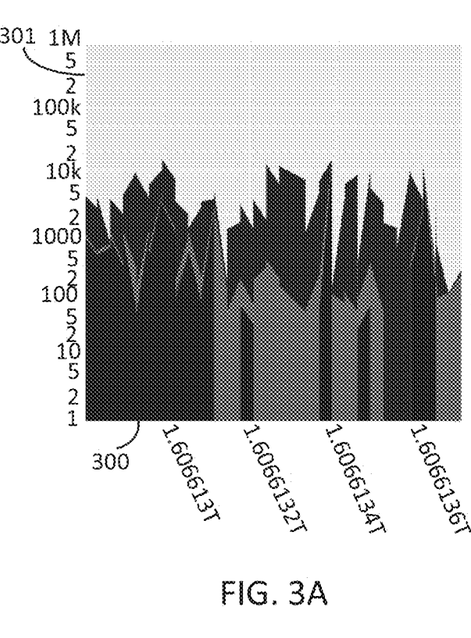
FIGS. 3A and 3B are example graphs of a use case example, according to one embodiment.
Figure 3B:
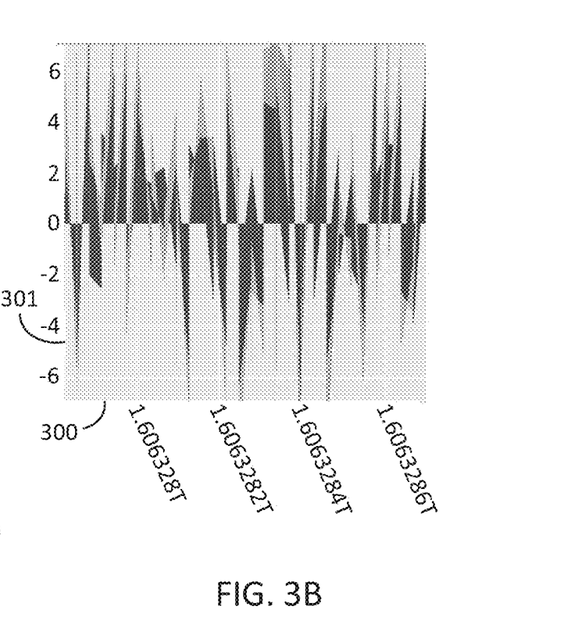

FIGS. 3A and 3B are example graphs illustrating platform activity according to a use case example of an embodiment of the invention.

In this use case example, a convolutional neural network is trained to predict how long and which platform was used or active for 15 minutes on a given device. The selected one or more applications are run in various scenarios on a device for 15 minutes. An application usage testing automation framework can be used for the test runs. Network traffic data generated by an application is captured and classified. The classified network traffic is here called a platform-activity. The term "classified" in this example is used to describe a process when a network traffic is grouped by a platform using predetermined platform recognition rules.

The captured platform activity is labelled according to an application scenario, such as "youtube15" which means that a report of 15 minutes (out of 15 minutes total) of "youtube" application usage is reported. A graph is plotted out of the captured platform activity as shown in FIGS. 3A and 3B. The features of the graphs are as follows: X axis (300) represents time, Y axis (301) represents the amount of network traffic (amount of bytes sent or received), the Y axis (301) is logarithmic in scale to prevent the streaming activity overtaking regular activity, each color encodes the platform (different platform is graphed by a different color), the graph is stacked (nothing overlaps).

Next the convolutional neural network (CNN) is trained to classify/predict application active usage time. The network model can be based on a Resnet architecture or any other architecture that is capable for image recognition/classification tasks. In an embodiment, a pretrained convolutional neural network is used to train it further. The CNN model may support multi-label classification. For example, the model is able to predict that a first application was active for 5 minutes and a second application for 10 minutes over the 15-minute period of time. In this example, each platform has predetermined three classes: one for a 5-minute usage, one for a 10-minute usage and one for a 15-minute usage.

In an embodiment, the graphs may also be generated based on raw traffic data in situations where platform recognition rules are not maintained. Further, more information can be encoded into the graph, such as inbound network traffic graphed as a negative value while outbound network traffic remaining as a positive value. In an embodiment, graph generating may be skipped and the network traffic data is transmitted with minimal transformation directly to the neural network.

Figure 4:
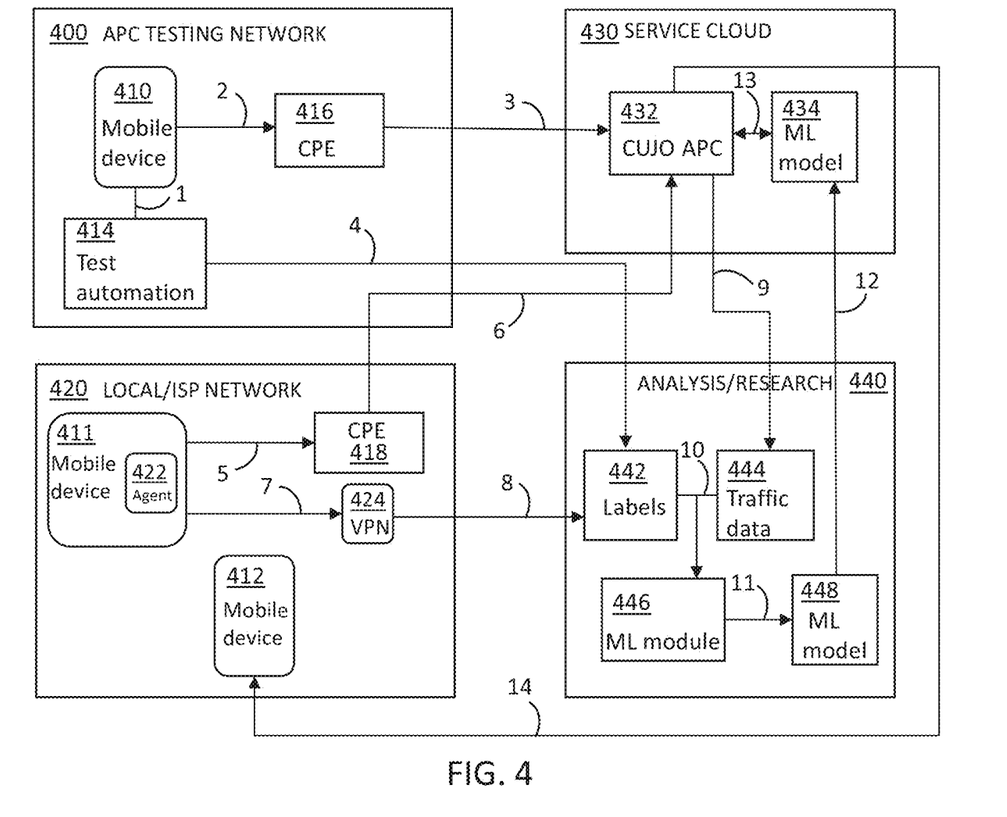
FIG. 4 is a block diagram of an example computer system environment for a computer system, according to one embodiment.

FIG. 4 is a block diagram that illustrates schematically another example of a system environment.

The system environment illustrated in FIG. 4 includes a plurality of computer networks 400, 420, such as a local network, that may include any number of mobile devices 410, 411, 412, and local routers 416, 418. The mobile devices 410, 411, 412 may comprise any number of client applications. The example system also includes a service cloud 430 and an analysis/research cloud 440 that may each comprise any number of application detection services/machine learning models 434, 448. The service cloud 430 comprises also an APC module 432 and the analysis/research cloud 440 comprises a traffic data label storage 442, a traffic data storage 444 and a machine learning module 446. Even though the different entities are illustrated as separate entities in this example, one or more of the entities can be combined into one entity and/or further entities may be added to any of the entities. For example, the service cloud entity 430 and the analysis/research cloud 440 may form a single entity.

One or more mobile devices 410, 411, 412 of each computer network of the plurality of computer networks 400, 420 also runs a dedicated software application, here an agent 422 at the mobile device 411 of a local or an internet service provider (ISP) network 420, for collecting and recording application network traffic metadata relating to other applications and software running on the mobile device 411 and using computer network. In an embodiment, the dedicated software agent 422 is deployed only in a limited number of the one or more mobile devices which is smaller than the total number of computer devices in a local network. The dedicated software agent 422 may be a stand-alone or embedded to another application. In an embodiment, the decision on whether the dedicated software agent 422 is configured to collect network traffic metadata or not, may be based on numerous factors and may be controlled by the service cloud, for example. These factors may be based on, for example, the identity of the computer network to which the computer device is connected, running detection only on limited number of computer devices, enabling detection only for new applications or updated versions of applications.

In this example system environment, one of the computer networks is a dedicated advanced parental controls (APC) testing network 400 that comprises a test automation module 414. The APC testing network 400 may also be part of the service cloud 430 or a separate entity of any other cloud service. The test automation module 414 runs a particular application on one or more mobile devices 410 and interacts with the application in a predetermined application scenario for a predetermined amount of time to simulate active mobile application usage. This process is illustrated by data feed 1 between the test automation 414 module and the mobile device 410. In response to the interaction with the mobile application, the mobile application generates network traffic which is routed via a customer-premises equipment (CPE), such as the router 416. The network traffic flow between the mobile device 410 and the router 416 is illustrated by data feed 2. The router 416 forwards the network traffic description information (netflow) to the service cloud 430 which is illustrated by data feed 3. The test automation module 414 further records which mobile applications were running on which mobile devices and this information is later used as a network traffic data (netflow) label. Data feed 4 illustrates the information flow between the test automation module 414 and the traffic data label storage 442.

The mobile device 411 of the computer network 420 generates network traffic data by casual application usage which is routed via the router 418 (data feed 5). The network traffic description information (netflow) related to the generated network traffic data is then forwarded to the service cloud 430 by the router 418 (data feed 6). The mobile device 411 (enabled by the security service provider) also sends an application screen time report to the network traffic data label storage 442 of the analysis/research module 440. The application screen time report is later used in network traffic data (netflow) labelling. This data may be sent using a secure connection (data feed 7) such as a virtual private network (VPN) tunnel. In an embodiment, a secure connection, such as the VPN tunnel 424, forwards the mobile application screen time report to the network traffic data label storage 442 (data feed 8).

The network traffic information data (netflow data) collected by the service cloud 430 is forwarded to the netflow data storage 444 (data feed 9). Labels are assigned to the netflow data at the analysis/research cloud 440 and after labelling, the network data is sent to the machine learning module 446 to train the machine learning model 448 (data feed 10). The machine learning module 446 infrastructure is configured to train the machine learning model 448 (data feed 11).

In an embodiment, the trained machine learning model 448 is propagated to the service cloud 430 (data feed 12) and the service cloud 430 uses the trained machine learning model 434 to make predictions about application active time on the mobile devices (data feed 13). In another embodiment, instead of the trained machine learning model, only the updated parts of the trained model are propagated to the service cloud 430 and the service cloud 430 uses this data to update the machine learning model 434.

In an embodiment, the application usage time is reported to the customer on a mobile device (data feed 14) and/or to the local/ISP network owner.

In an embodiment, each mobile device 410, 411 may transmit the collected application network traffic metadata via the local router 416, 418 but also sending directly via a network gateway is possible, for example when the device is not in the computer network. The collected application network traffic metadata may comprise following data but is not limited to it: an application name, an identification of the application, a version of the application, a network traffic protocol type (e.g. Transmission Control Protocol (TCP), Hypertext Transfer Protocol (HTTP), Hypertext Transfer Protocol Secure (HTTPS), User Datagram Protocol (UDP), Domain Name System (DNS), Multicast DNS (MDNS)), a timestamp of a connection, a connection target, a connection direction, number of transferred bytes to upstream and/or downstream, and a computer device identification running the dedicated software application.

Each local router 416, 418 of the plurality of local networks collects network traffic data from the local network. Data feeds 3, 6, 14 from the local routers 416, 418 and the one or more computer devices are combined by matching metadata attributes and labeling the data based on application information received.

In an embodiment, the collected data is automatically labeled and classified based on metadata. In an embodiment, each computer device that is used to collect the metadata may be selected based on different rules. For example, the computer device may be pinned to the router and only data sent by a computer device that is marked to be managed by the router is collected. Thus, a computer device may not send any data unless it is connected to its "home" router, for example. In some embodiments, the computer devices that are used for data collection may also be changed depending on geolocation, and/or date/time, for example.

The collected and processed data is used to create one or more machine learning models and/or rules to estimate active application usage based on the network traffic that is collected. Accurate active application usage estimation may be used to record and show application usage times, to enforce application and/or application category specific time limits and to block any malicious applications, for example.

Continuous training/improving of the machine learning model may also be integrated to this active application usage detection testing automation framework by regularly repeating, by the testing entity/network, the running of the applications in various application scenarios and sending the network traffic data generated by the applications to the service cloud. Further, any other sophisticated test scenarios can be used to improve the prediction accuracy. Continuous training of the machine learning model assures that active application usage time predictions always remain up to date with applications.

Figure 5:
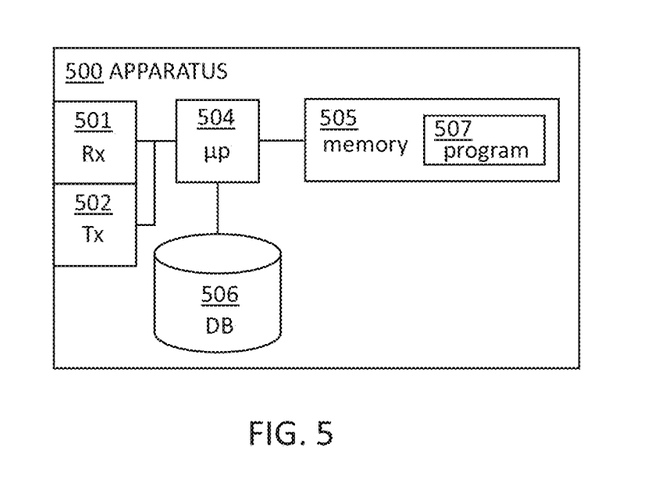
FIG. 5 is a block diagram of a computer apparatus, according to one embodiment.

FIG. 5 is a block diagram illustrating an example of a network apparatus that can implement the method according to an embodiment.

A processor device 504 is provided that is configured to run one or more applications in various application scenarios on one or more user devices for a predetermined time period, capture network traffic data generated by the one or more applications, label the network traffic data according to an application scenario of the one or more applications and with respect the user device of the one or more user devices; determine an active application usage time in relation to the application scenario during the predetermined time period based on the labelling; train a machine learning model to estimate active application usage time based on the determining; and use the machine learning model to estimate active application usage time on the one or more user devices.

In an embodiment, the processor device 504 is configured to store data such as any network-based identification data, metadata, attributes, values, addresses, hostnames as well as other data related to received network traffic data, any metadata, state information and/or domain data to the database 506. The database 506 is shown in this example as being located at the apparatus 500, but it will be appreciated that the apparatus 500 may alternatively access a remote database. The database 506 may comprise necessary data collected from user devices and/or plurality of local networks.

The apparatus 500 is provided with a receiver 501 that receives the collected network traffic metadata. A transmitter 502 is also provided for communication with a computer network, a router, a computer device and/or an outside server.

In the above description, the apparatus 500 is described as having a separate transmitter and receiver. It will be appreciated that these may be disposed in any suitable manner, for example in a single transmitter and receiver, a transceiver and so on. Similarly, a single processor 504 is described but it will be appreciated that the function of the processor may be performed by a single physical processor or by more than one processor.

The apparatus 500 is also provided with a non-transitory computer readable medium in the form of a memory 505. The memory may be used to store a computer program 507 which, when executed by the processor 504, causes the processor 504 to perform the functions described above. The computer program 507 may be provided from an external source. In an embodiment, at least some or even all the functions of the method can be implemented in any apparatus, for example any computer device or a server.

Figure 6:
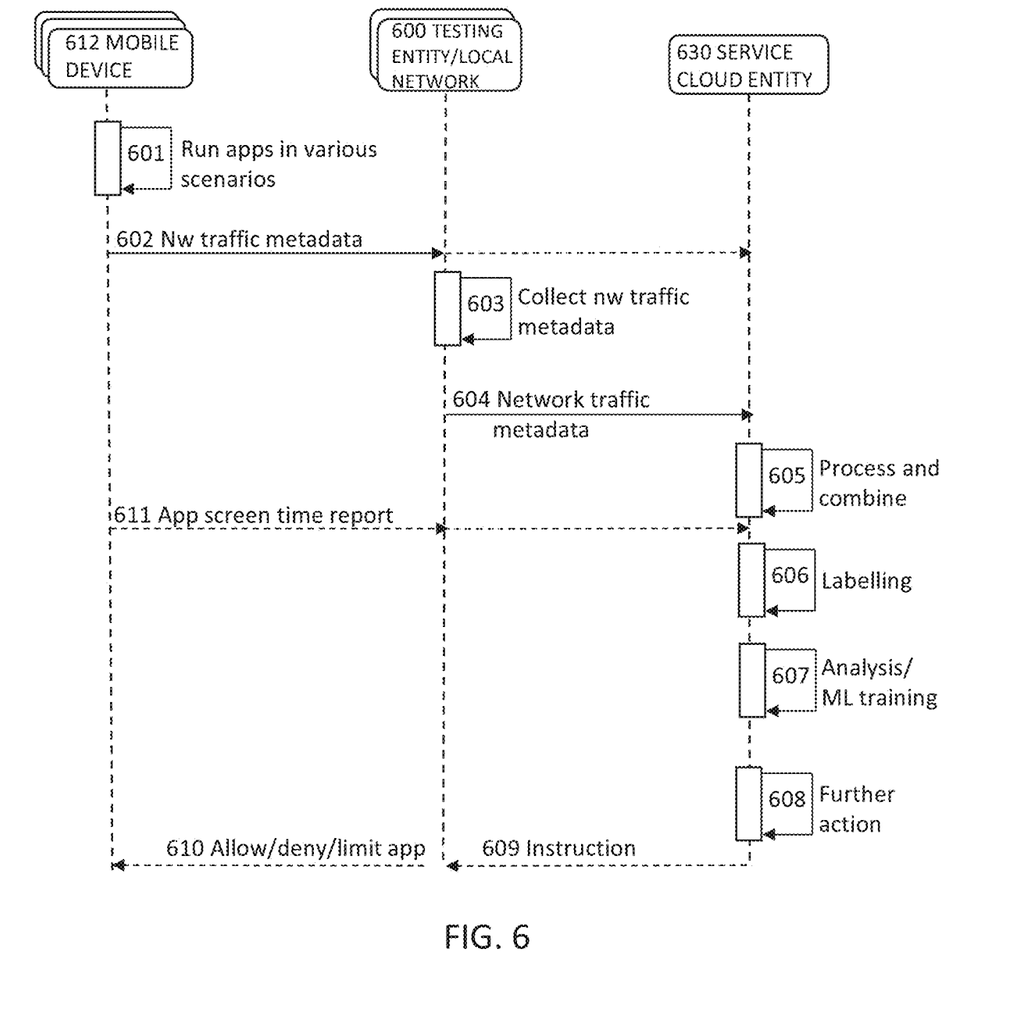
FIG. 6 illustrates a signal sequence diagram, according to one embodiment.

FIG. 6 a signal sequence diagram illustrating a process according to one embodiment.

The steps, signaling messages and related functions described in relation to FIG. 6 are in no absolute chronological order, and some of the steps may be performed simultaneously or in a different order.

In 601, one or more mobile devices 610 of one or more computer network systems runs one or more applications in various application scenarios for predetermined time. Network traffic metadata generated by the running of the one or more applications may comprise application specific network usage metadata, such as data on which application was used in which of the one or more mobile devices. In 602, the network traffic metadata is sent to a testing entity 600, for example, via using Wi-Fi and home network router connection of each mobile device. In 603, the testing entity collects the network traffic metadata and in 604, the testing entity sends raw unclassified network traffic metadata to a service cloud entity 630. There may be one or more testing entities and/or other local/ISP network systems that collect network traffic metadata related to the one or more applications for the service cloud entity 630. For example, the network traffic metadata may comprise data from casual application usage on one or more mobile devices that is also sent to the service cloud entity 630 from any local/ISP network.

In 605, all the network traffic metadata received from the testing entity and/or from any other local/ISP network systems received by the service cloud entity 630 is processed and combined by matching metadata attributes. In 606, the received data is labelled based on the metadata attributes, such as an identity of the application and the related device and the application scenario. Any other data, such as application screen time reports sent from the one or more mobile devices (611), may also be used in the labelling phase. The labelling data and raw combined network activity data is used to create machine learning datasets suitable for machine learning training in 607, and a machine learning model for estimating active application usage is trained by using the datasets created.

In 608, the trained machine learning model is used for estimating active application usage time on the one or more user devices and based on the results from the machine learning model, further action can be taken to protect one or more local networks and/or the one or more user devices. In 609, instructions for controlling or managing a client application is sent. The further action may comprise one or more of: blocking the client application, enforcing time limits to client application or application categories, preventing communication with the client application, applying other security measures (612.

The steps, signaling messages and related functions described above in relation to the figures are in no absolute chronological order, and some of the steps may be performed simultaneously or in a different order. Other functions may also be executed between the steps and other signaling may be sent between the illustrated ones. Some of the steps can also be left out or replaced by a corresponding step. The system functions illustrate a procedure that may be implemented in one or more physical or logical entities.

The techniques described herein can be implemented by various means. An apparatus or system that implements one or more of the described functions may comprise not only existing means but also means for implementing one or more functions of a corresponding apparatus that is described with an embodiment. An apparatus or a system may also comprise separate means for each separate function. For example, the embodiments may be implemented in one or more modules of hardware or combinations thereof. For software, implementation can be through modules, for example such procedures and functions that perform the functions described. The software code may be stored in any suitable data storage medium that is readable by processors, computers, memory units or articles of manufacture, and may be executed by one or more processors or computers. The data storage medium or memory unit or database may be implemented within the processor or computer apparatus, or as an external part of the processor or computer apparatus.

The programming, such as executable code or instructions, electronic data, databases or other digital information may be stored into memories and can include a processor-usable medium embodied in any computer program product which can contain, store, or maintain programming, data or digital information for use by or in connection with an instruction execution system, such as the processor.

An embodiment provides a non-transitory computer-readable medium comprising stored program code comprised of computer-executable instructions. The computer program code comprises a code for receiving first network traffic metadata collected by one or more user devices and being related to one or more client applications running on the one or more user devices. The computer program comprises also a code for running one or more applications in various application scenarios on one or more user devices for a predetermined time period; a code for capturing network traffic data generated by the one or more applications; a code for labelling the network traffic data according to an application scenario of the one or more applications and with respect to the user device of the one or more user devices; a code for determining an active application usage time in relation to the application scenario during the predetermined time period based on the labelling; a code for training a machine learning model to estimate active application usage time based on the determining; and a code for using the machine learning model to estimate active application usage time on the one or more user devices.

Although the invention has been described in terms of preferred embodiments as set forth above, these embodiments are illustrative only and that the claims are not limited to those embodiments. Those skilled in the art will be able to make modifications and alternatives in view of the disclosure which are contemplated as falling within the scope of the appended claims. Each feature disclosed or illustrated in the present specification may be incorporated in the invention, whether alone or in any appropriate combination with any other feature disclosed or illustrated herein.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
running one or more applications in various application scenarios on one or more user devices for a predetermined time period, wherein the various application scenarios mimic entries of user input into the one or more user devices;
capturing network traffic data generated by the one or more applications generated in response to the mimicked entries of user input;
labelling the network traffic data according to an application scenario of the one or more applications and with respect to a user device of the one or more user devices;
determining an active application usage time in relation to the application scenario during the predetermined time period based on the labelling;
training a machine learning model to estimate the active application usage time in the presence of background application usage based on the determining; and
using the machine learning model to estimate the active application usage time on the one or more user devices.

2. The method according to claim 1, further comprising retraining the machine learning model continuously based on further network traffic data captured from the one or more user devices running further applications in various application scenarios.

3. The method according to claim 1, wherein the one or more applications are run on one or more test devices interacting with the one or more applications in predefined application scenarios to simulate active application usage.

4. The method according to claim 1, wherein the one or more applications are run on the one or more user devices in one or more internet service provider networks.

5. The method according to claim 1, further comprising receiving an application screen time report from the one or more user devices and using the application screen time report for the labelling of the network traffic data according to the application scenario.

6. The method according to claim 1, further comprising forwarding the network traffic data generated by the one or more applications to a security service cloud for the labelling.

7. The method according to claim 1, further comprising classifying the network traffic data by a platform of the one or more user devices by using predetermined platform recognition rules.

8. The method according to claim 7, further comprising:
generating, based on the labelling, a graph that indicates an amount of network traffic data during the predetermined time period with different colors, each color indicating a related platform where a graph label is inherited from the network traffic data; and
training the machine learning model based on the graph.

9. The method according to claim 1, further comprising taking further action on the basis of the estimated active application usage time, wherein the further action comprises one or more of: reporting application usage time to the one or more user devices, controlling or blocking usage of the one or more applications, enforcing time limits on the one or more applications or on application categories, preventing communication with the one or more applications, and applying other security measures to protect a local network and/or the one or more user devices.

10. A computer network system comprising:
one or more processor devices, and a non-transitory computer-readable medium comprising stored program code, the program code comprising computer-executable instructions that, when executed by the one or more processor devices, cause the one or more processor devices to:
capture, by a testing entity, network traffic data generated by one or more applications that are run in various application scenarios on one or more user devices for a predetermined time period, wherein the various application scenarios mimic entries of user input into the one or more user devices and the network traffic data is generated in response to the mimicked entries of user input;
send, by the testing entity, the network traffic data to a security service cloud entity;
store, by the security service cloud entity, the network traffic data received from the testing entity;
label, by the security service cloud entity, the network traffic data according to an application scenario of the one or more applications and with respect to a user device of the one or more user devices;
determine, by the security service cloud entity, an active application usage time in relation to the application scenario during the predetermined time period based on the labelling;
train, by the security service cloud entity, a machine learning model to estimate the active application usage time in the presence of background application usage based on the determining; and
use, by the security service cloud entity, the machine learning model to estimate the active application usage time on the one or more user devices.

11. The computer network system according to claim 10, wherein the computer-executable instructions further cause the one or more processor devices to simulate, by the testing entity, active application usage in a test environment.

12. The computer network system according to claim 10, wherein the testing entity comprises one or more user devices in an Internet service provider network configured to generate the network traffic data from a real application usage of the one or more applications.

13. The computer network system according to claim 10, wherein the testing entity further comprises a network traffic hub for forwarding the network traffic data to the security service cloud entity.

14. The computer network system according to claim 10, wherein the testing entity further comprises a secure connection module for forwarding an application screen time report to the security service cloud entity.

15. The computer network system according to claim 10, wherein the testing entity further comprises a test automation module for recording and forwarding information on the one or more applications and the respective user devices running the one or more applications to the security service cloud entity.

16. The computer network system according to claim 10, wherein the testing entity is further configured to regularly:
repeat the running of the one or more applications and/or further applications; and
send the network traffic data generated by the one or more applications and/or the further applications to the security service cloud entity.

17. An apparatus in a computer network system comprising: one or more processor devices and a non-transitory computer-readable medium comprising stored program code, the program code comprising computer-executable instructions that, when executed by the one or more processor devices, cause the one or more processor devices to:
run one or more applications in various application scenarios on one or more user devices for a predetermined time period, wherein the various application scenarios mimic entries of user input into the one or more user devices;
capture network traffic data generated by the one or more applications generated in response to the mimicked entries of user input;
label the network traffic data according to an application scenario of the one or more applications and with respect to a user device of the one or more user devices;
determine an active application usage time in relation to the application scenario during the predetermined time period based on the labelling;
train a machine learning model to estimate the active application usage time in the presence of background application usage based on the determining; and
use the machine learning model to estimate the active application usage time on the one or more user devices.

18. The apparatus according to claim 17, wherein the computer-executable instructions further cause the one or more processor devices to run the one or more applications on one or more test devices interacting with the one or more applications in predefined application scenarios to simulate active application usage.

19. The apparatus according to claim 17, wherein the computer-executable instructions further cause the one or more processor devices to:
classify the network traffic data by a platform of the one or more user devices by using predetermined platform recognition rules;
generate, based on the labelling, a graph that indicates an amount of network traffic data during the predetermined time period with different colors, each color indicating a related platform where a graph label is inherited from the network traffic data; and
train the machine learning model based on the graph.

20. A non-transitory computer-readable medium comprising stored program code, the program code comprising computer-executable instructions that, when executed by a processor, cause the processor to:
  run one or more applications in various application scenarios on one or more user devices for a predetermined time period;
  capture network traffic data generated by the one or more applications;
  receive an application screen time report from the one or more user devices;
  use the application screen time report to label the network traffic data according to an application scenario of the one or more applications and with respect to a user device of the one or more user devices;
  determine an active application usage time in relation to the application scenario during the predetermined time period based on the labelling;
  train a machine learning model to estimate the active application usage time based on the determining; and
  use the machine learning model to estimate the active application usage time on the one or more user devices.

* * * * *